(12) United States Patent
Kung et al.

(10) Patent No.: US 9,889,522 B2
(45) Date of Patent: Feb. 13, 2018

(54) LASER PROCESSING SYSTEM

(71) Applicant: Panasonic Intellectual Property Management Co., Ltd, Osaka (JP)

(72) Inventors: Yiheng Kung, Osaka (JP); Yasushi Mukai, Osaka (JP); Wataru Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 63 days.

(21) Appl. No.: 15/118,858

(22) PCT Filed: Feb. 24, 2015

(86) PCT No.: PCT/JP2015/000895
§ 371 (c)(1),
(2) Date: Aug. 13, 2016

(87) PCT Pub. No.: WO2015/129249
PCT Pub. Date: Sep. 3, 2015

(65) Prior Publication Data
US 2017/0050267 A1   Feb. 23, 2017

(30) Foreign Application Priority Data
Feb. 25, 2014   (JP) ................. 2014-033760

(51) Int. Cl.
B23K 26/38   (2014.01)
B23K 26/06   (2014.01)
B23K 26/70   (2014.01)

(52) U.S. Cl.
CPC .......... *B23K 26/0648* (2013.01); *B23K 26/38* (2013.01); *B23K 26/703* (2015.10); *B23K 26/706* (2015.10)

(58) Field of Classification Search
CPC .......... B23K 26/06; B23K 26/70; B23K 26/38
(Continued)

(56) References Cited

U.S. PATENT DOCUMENTS

| 6,120,976 A | 9/2000 | Treadwell et al. |
| 2008/0221725 A1* | 9/2008 | Wakazono ......... B23K 26/0093 700/179 |

(Continued)

FOREIGN PATENT DOCUMENTS

| CN | 1326392 | 12/2001 |
| CN | 102307697 | 1/2012 |

(Continued)

OTHER PUBLICATIONS

International Search Report of PCT application No. PCT/JP2015/000895 dated May 26, 2015.

*Primary Examiner* — Samuel M Heinrich
(74) *Attorney, Agent, or Firm* — Wenderoth, Lind & Ponack, L.L.P.

(57) ABSTRACT

The laser processing head of the present disclosure includes a collimation lens, a focus lens, a first parallel plate, a first drive unit, a second parallel plate, and a second drive unit. The collimation lens collimates a laser beam having a first optical axis, and the focus lens condenses the collimated laser beam. The first parallel plate shifts the optical axis of the condensed laser beam to a second optical axis. The first drive unit rotates the first parallel plate around a first rotation axis. The second parallel plate shifts the optical axis of the laser beam shifted to the second optical axis, to a third optical axis. The second drive unit rotates the second parallel plate around a second rotation axis. The direction of the first rotation axis and the direction of the second rotation axis are identical.

16 Claims, 10 Drawing Sheets

(58) Field of Classification Search
USPC .................................... 219/121.67–121.72
See application file for complete search history.

(56) References Cited

U.S. PATENT DOCUMENTS

| | | | |
|---|---|---|---|
| 2010/0044350 A1* | 2/2010 | Heiml | ................. B23K 37/047 219/121.14 |
| 2010/0326138 A1 | 12/2010 | Kumatani et al. | |
| 2011/0297654 A1 | 12/2011 | Yoshikawa et al. | |

FOREIGN PATENT DOCUMENTS

| | | |
|---|---|---|
| JP | 63-038913 | 2/1988 |
| JP | 6-069928 | 3/1994 |
| JP | 8-192286 | 7/1996 |
| JP | 11-156579 | 6/1999 |
| JP | 2001-047273 | 2/2001 |
| JP | 2002-530205 | 9/2002 |
| JP | 2003-295083 | 10/2003 |
| JP | 2004-202537 | 7/2004 |
| JP | 2004-306106 | 11/2004 |
| JP | 2006-346698 | 12/2006 |
| JP | 2008-000801 | 1/2008 |
| JP | 2008-087028 | 4/2008 |
| JP | 2009-139692 | 6/2009 |
| JP | 2011-011212 | 1/2011 |
| JP | 2011-143420 | 7/2011 |
| JP | 2011-167704 | 9/2011 |

\* cited by examiner

LASER PROCESSING SYSTEM

The application is a U.S. national stage application of the PCT international application No. PCT/JP2015/000895.

TECHNICAL FIELD

The present disclosure relates to a laser processing head and a laser processing system for performing laser welding by irradiating a processing point with a laser beam from a position located apart from the processing point, in particular to a configuration of the laser processing head.

BACKGROUND ART

In recent years, a processing method called remote laser processing has drawn attention, which performs laser welding by irradiating a processing point with a laser beam from a position located apart from the processing point by using a laser beam having a long focal length.

Conventionally, in the remote laser processing, a laser beam spinner (Laser Beam Spinner, laser processing head) which controls the irradiation position of the laser beam by rocking two mirrors is used, as described in PTL 1.

Figure 10:
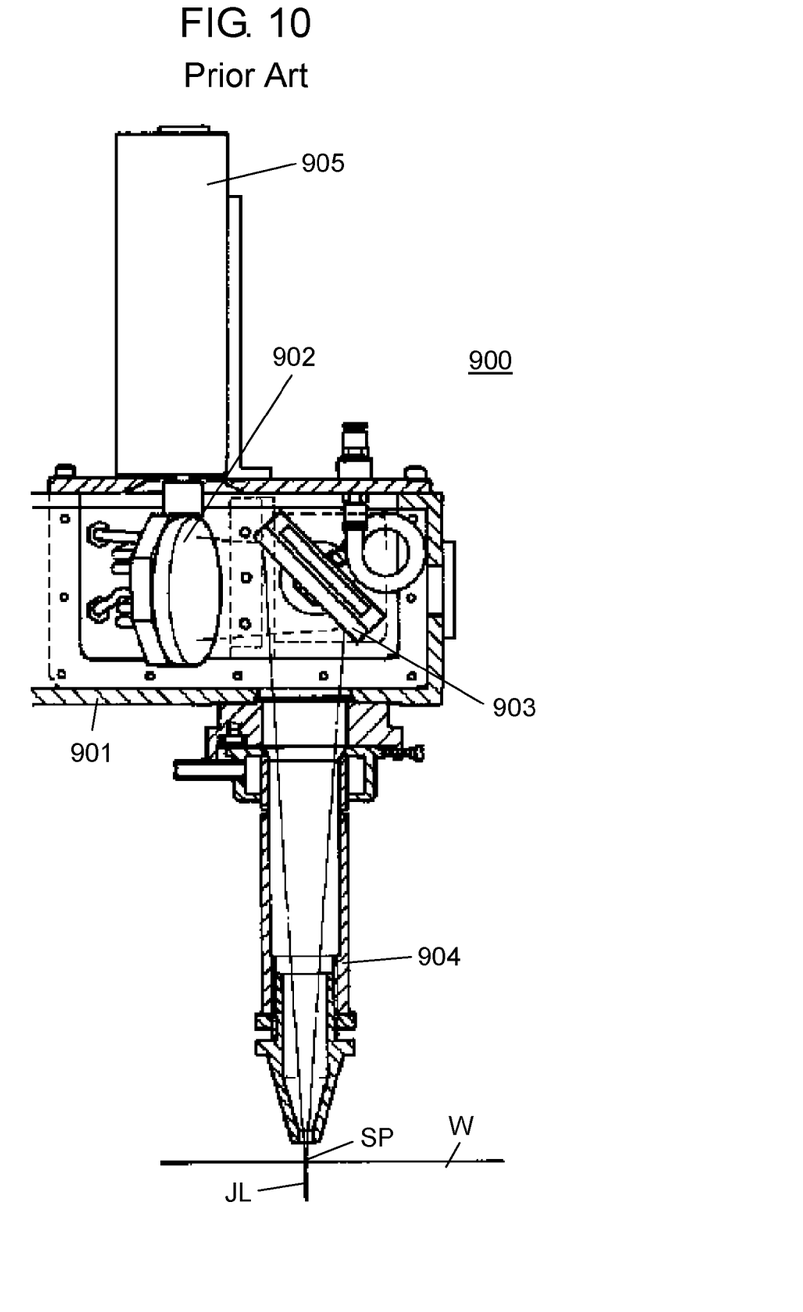
FIG. 10 is a cross-sectional view showing a conventional laser beam spinner.

A description of conventional laser beam spinner 900 will be given with reference to FIG. 10. FIG. 10 is a cross-sectional view showing conventional laser beam spinner 900.

Conventional laser beam spinner 900 has housing 901, first rocking mirror 902, second rocking mirror 903, torch nozzle 904, first galvanometer 905, and a second galvanometer (not shown). A laser beam incident on housing 901 is reflected by first rocking mirror 902 and second rocking mirror 903, and is emitted from torch nozzle 904. Beam irradiation point SP in the vicinity of seam JL of workpiece W is irradiated with the laser beam emitted from torch nozzle 904, and the laser welding is performed. At this time, by changing a rotation angle of first rocking mirror 902 by first galvanometer 905, and by changing a rotation angle of second rocking mirror 903 by a second galvanometer (not shown), beam irradiation point SP can be spun or scanned.

Further, PTL 2 describes a laser beam oscillator for reciprocating a spot of the laser beam by rotating a first plane light transmitting plate and a second plane light transmitting plate in opposite directions to each other at the same cycle by a single drive motor.

CITATION LIST

Patent Literatures

PTL 1: Unexamined Japanese Patent Publication No. 8-192286
PTL 2: Unexamined Japanese Utility Model Publication No. 6-69928

SUMMARY OF THE INVENTION

However, in the conventional laser beam spinner described in PTL 1, the two galvanometers are very expensive in order to control each of the rocking mirrors with a high speed and high accuracy. Furthermore, since a relationship between the rotation angles of the two rocking mirrors and the irradiation point of the laser beam on the workpiece is non-linear, correction of the focal position of the laser beam is necessary. For this purpose, the conventional laser beam spinner further needs to be provided with an expensive fθ lens.

Further, since the conventional laser beam oscillator described in PTL 2 has only one drive motor, the beam spot has only very limited movement, and the beam spot cannot be moved for scanning with accuracy used in the remote laser processing.

The present disclosure provides a laser processing head and laser processing system to solve the above problems.

In order to solve the above problems, the laser processing head of the present disclosure includes a collimation lens, a focus lens, a first parallel plate, a first drive unit, a second parallel plate, a second drive unit. The collimation lens collimates a laser beam having a first optical axis, and the focus lens condenses the collimated laser beam. The first parallel plate shifts an optical axis of the condensed laser beam to a second optical axis. The first drive unit rotates the first parallel plate around a first rotation axis. The second parallel plate shifts the optical axis of the laser beam shifted to the second optical axis, to a third optical axis. The second drive unit rotates the second parallel plate around a second rotation axis. The direction of the first rotation axis and the direction of the second rotation axis are identical.

Further, the laser processing system of the present disclosure includes the laser processing head described above, a manipulator, a robot controller, and a laser oscillator. The laser processing head is mounted to a tip of the manipulator. The robot controller controls an operation of the laser processing head and an operation of the manipulator. The laser oscillator outputs a laser beam.

According to the laser processing head and laser processing system of the present disclosure, a small-sized and light-weight laser processing head as compared with the conventional galvano head and a laser processing system using the laser processing head can be achieved.

DESCRIPTION OF EMBODIMENT

Exemplary Embodiment

Figure 1:
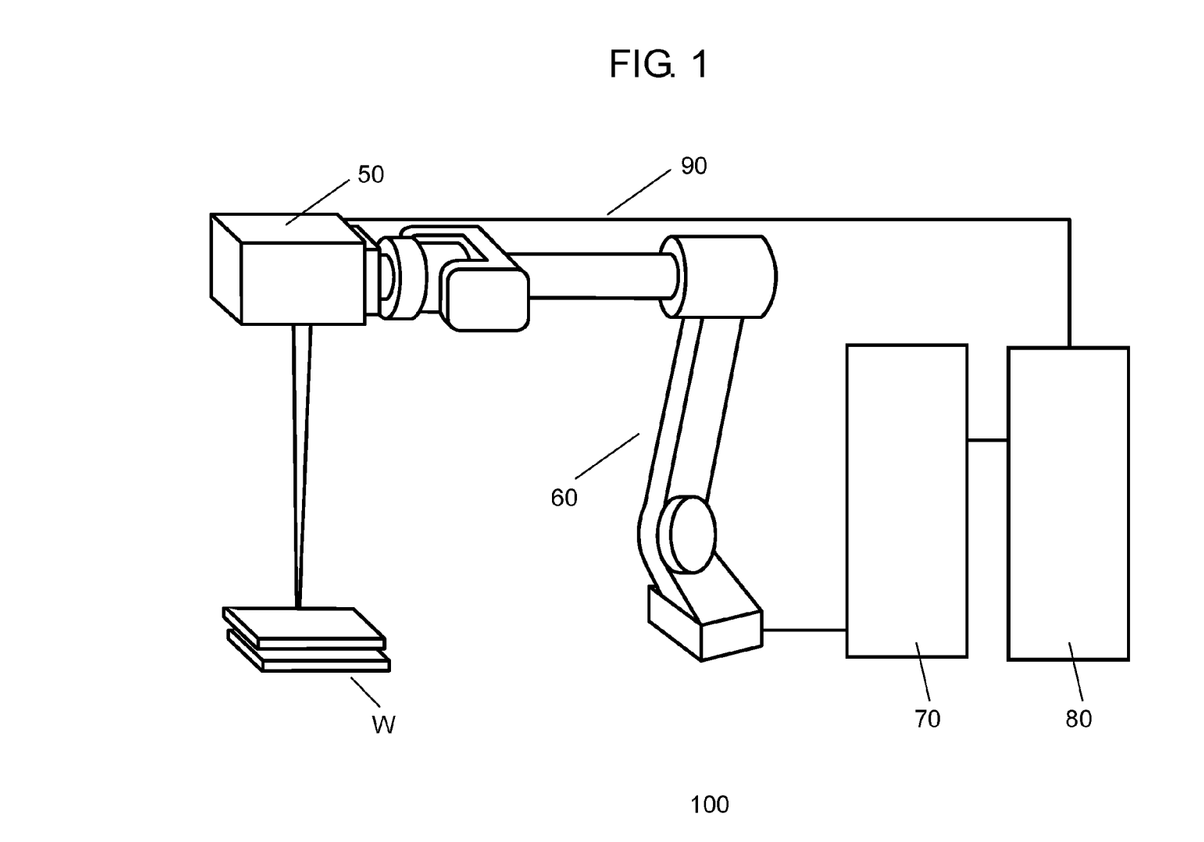
FIG. 1 is a schematic diagram showing a configuration of a laser processing apparatus according to an exemplary embodiment.
Figure 2:
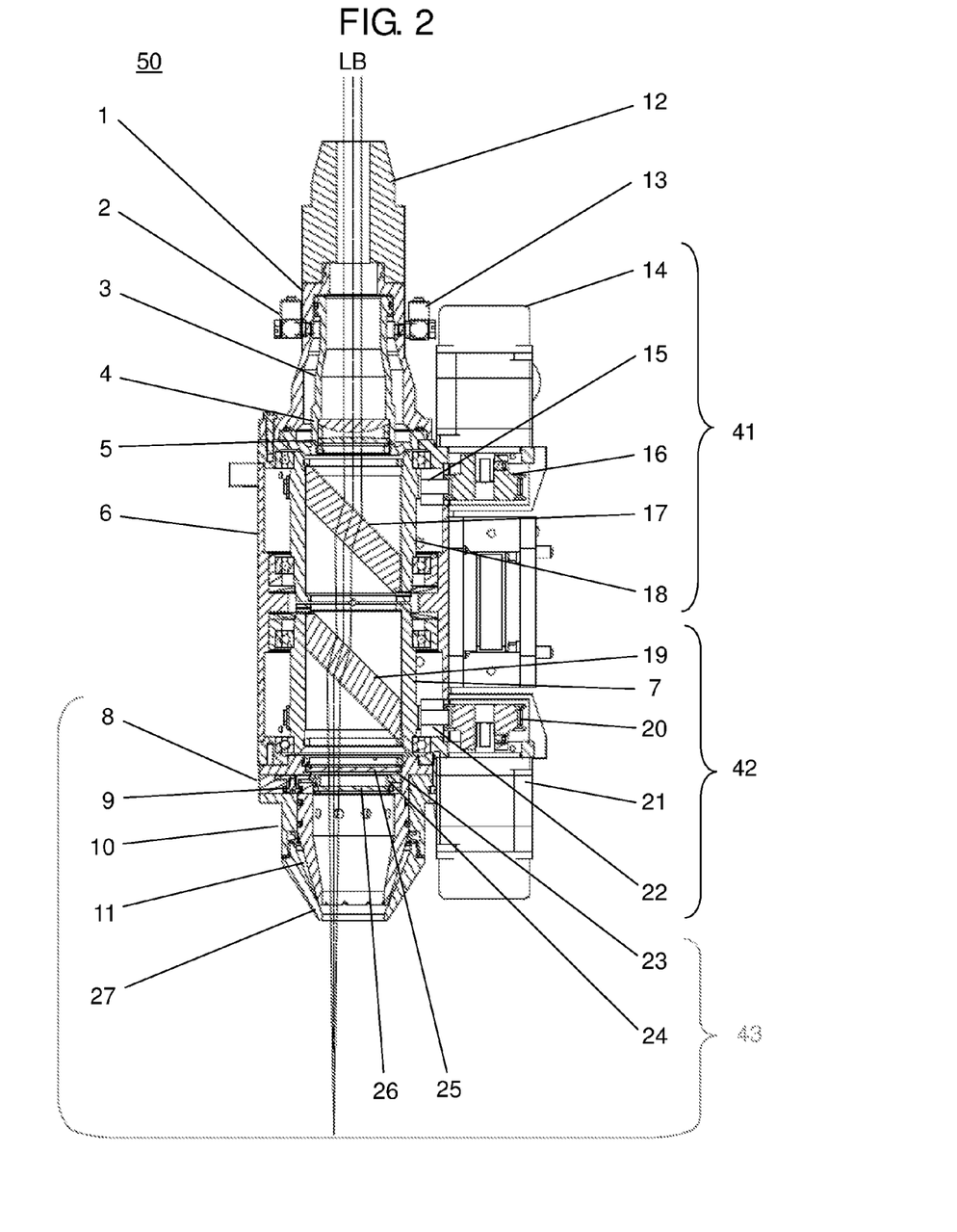
FIG. 2 is a cross-sectional view of a laser processing head according to the exemplary embodiment.
Figure 3:
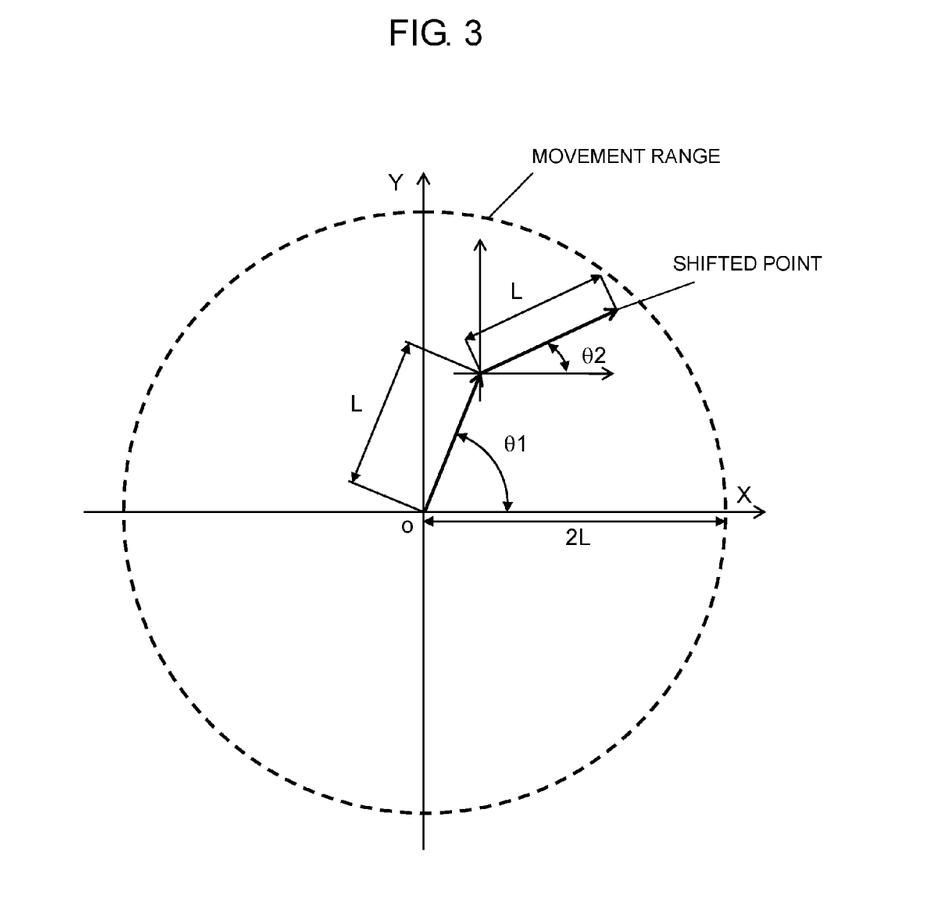
FIG. 3 is a view for illustrating an irradiation position of a laser beam in the exemplary embodiment.
Figure 4:
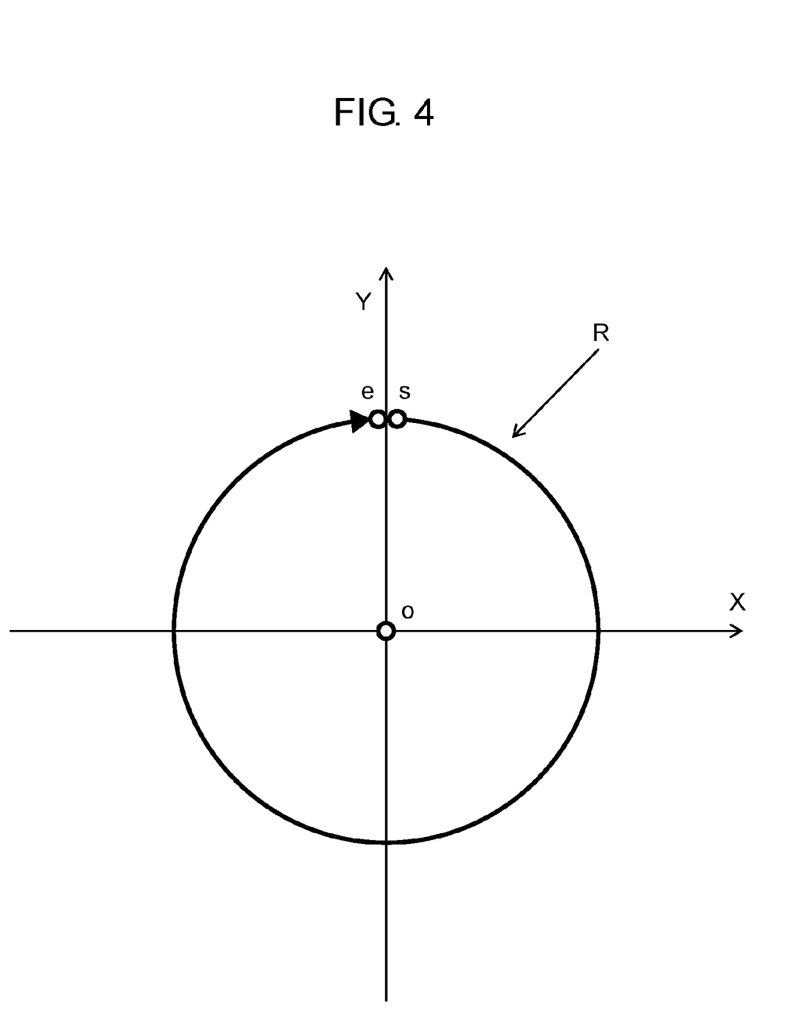
FIG. 4 is a plan view showing a circular trajectory of a laser beam in the exemplary embodiment.
Figure 5:
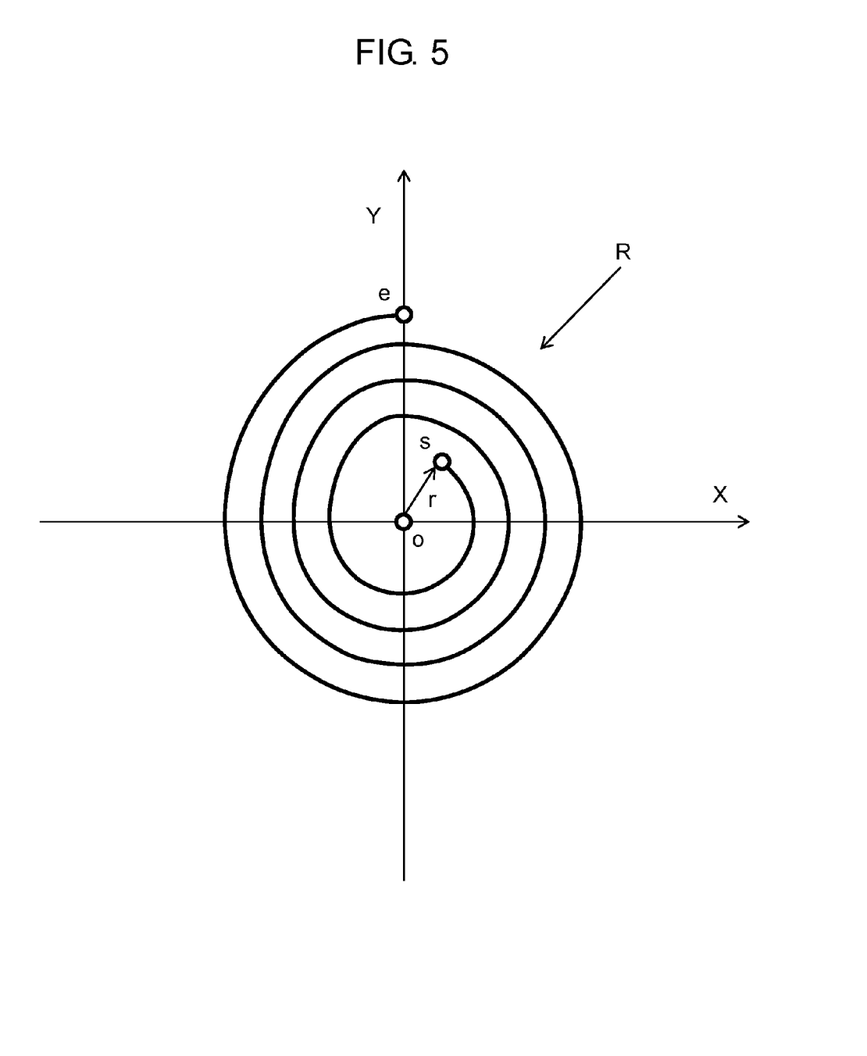
FIG. 5 is a plan view showing a spiral-shaped trajectory of a laser beam in the exemplary embodiment.
Figure 6:
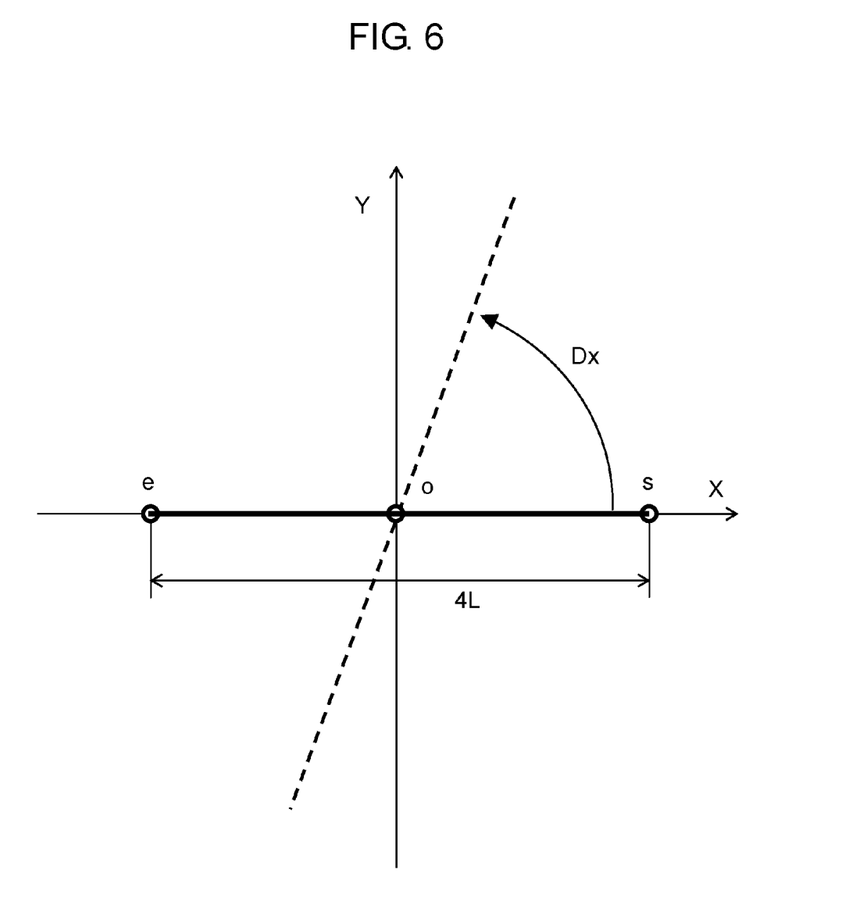
FIG. 6 is a plan view showing a linear trajectory of a laser beam in the exemplary embodiment.
Figure 7:
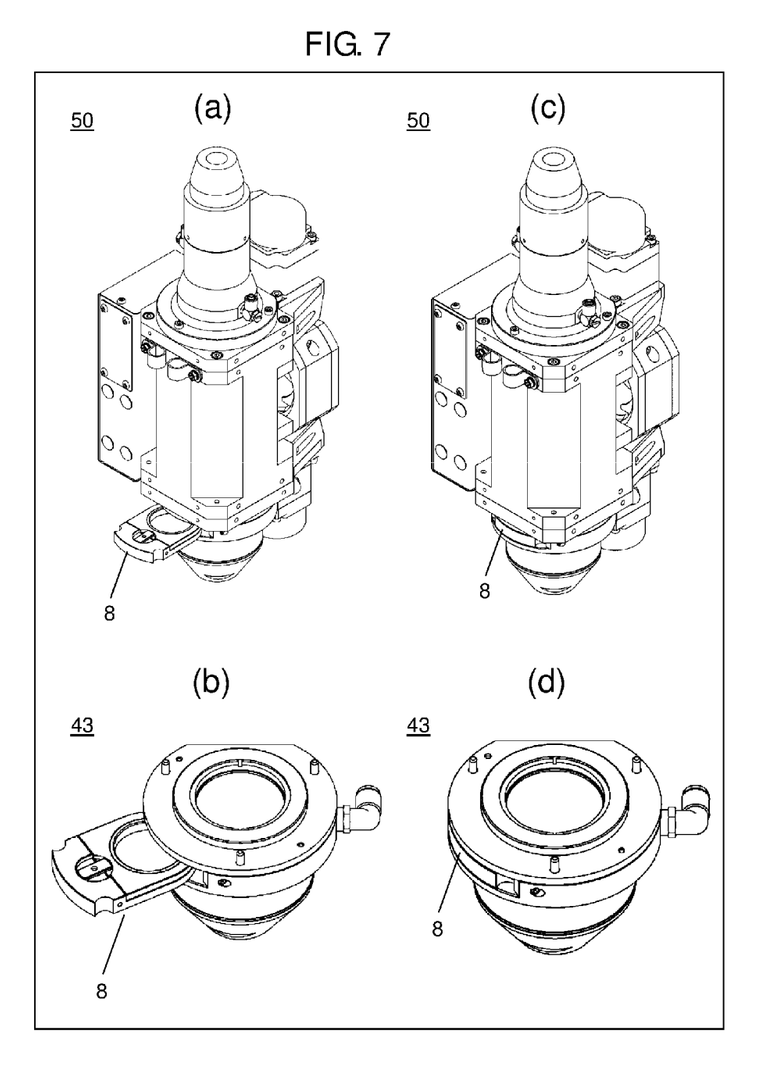
FIG. 7 is a diagram showing a laser processing head of the present exemplary embodiment, and portion (a) of FIG. 7 is a perspective view of a state in which a shield holder is taken out from the laser processing head, protion (b) of FIG. 7 is the enlarged view of the state in which the shield holder is taken out from the laser processing head, portion (c) of FIG. 7 is a perspective view of a state in which the shield holder is housed in the laser processing head, and portion (d) of FIG. 7 is an enlarged view of the state in which the shield holder is housed in the laser processing head.
Figure 8:
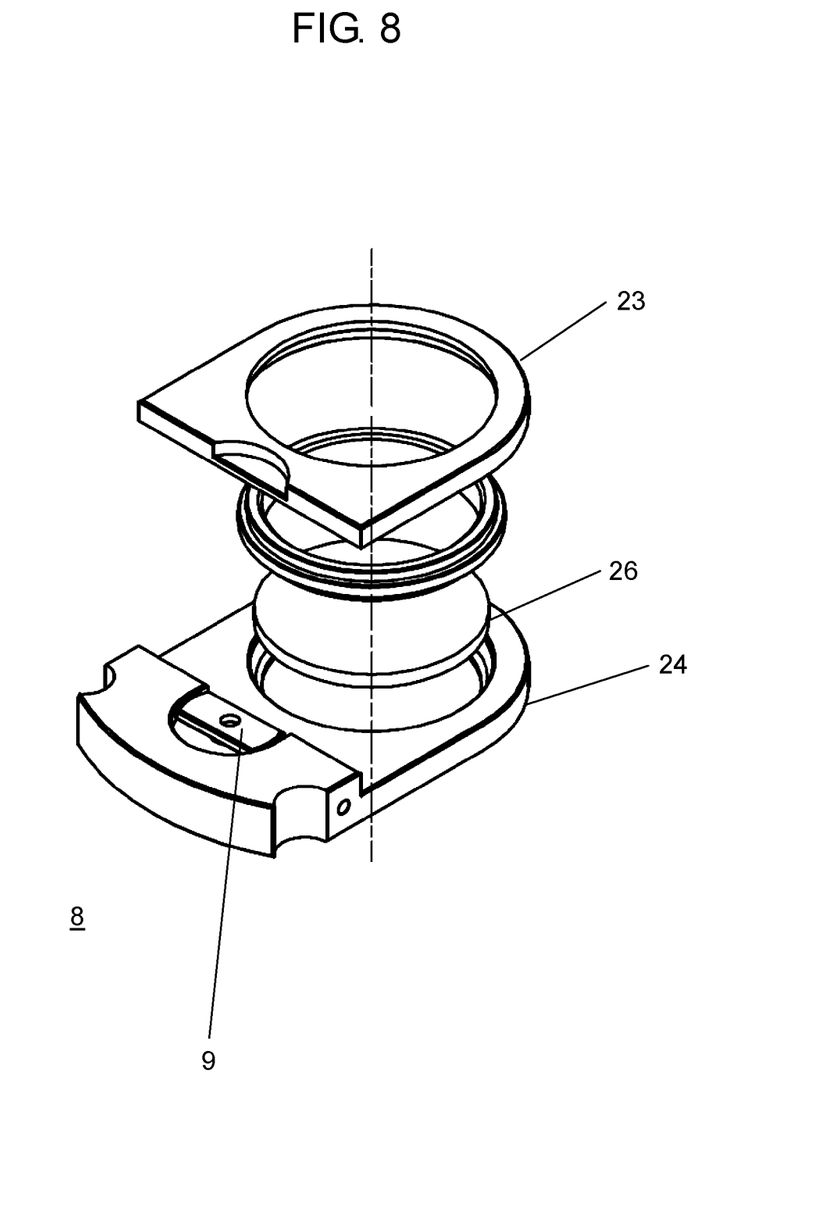
FIG. 8 is an exploded view showing the shield holder of the exemplary embodiment.
Figure 9:
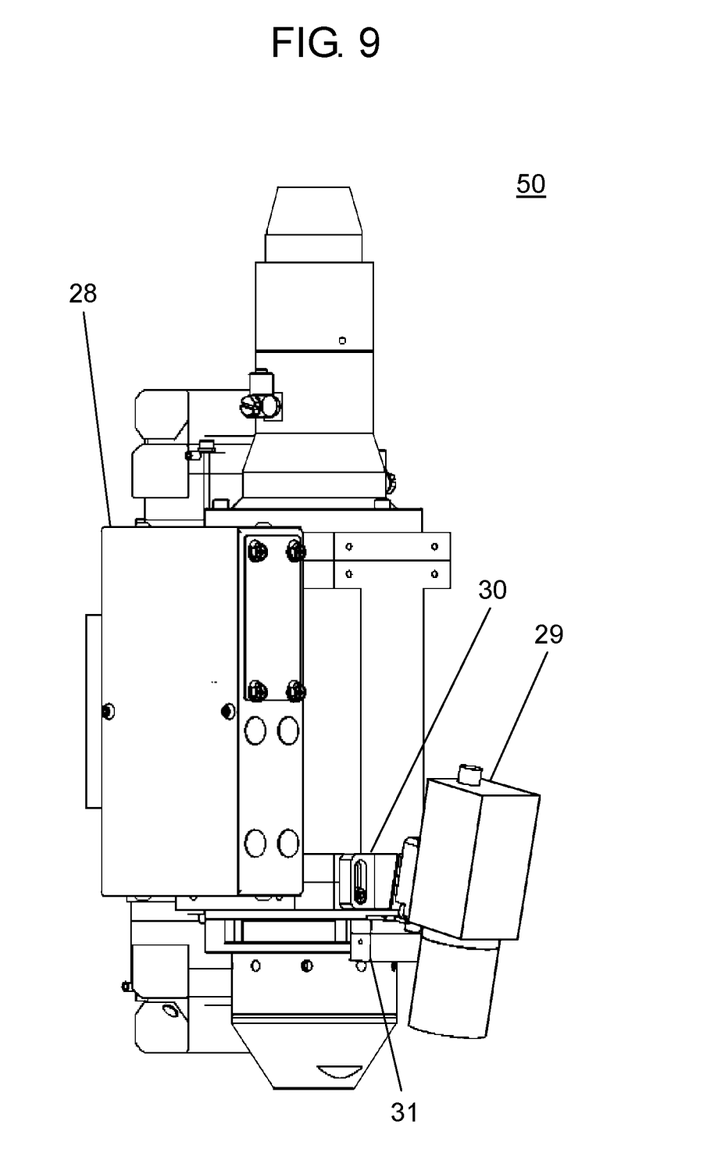
FIG. 9 is an external view of the laser processing head in the exemplary embodiment.

Hereinafter, an exemplary embodiment of the present disclosure will be described with reference to FIGS. 1 to 9. FIG. 1 is a schematic diagram showing a configuration of laser processing apparatus 100 according to the present exemplary embodiment. FIG. 2 is a cross-sectional view of laser processing head 50 according to the present exemplary embodiment. FIG. 3 is a view for illustrating an irradiation position of a laser beam in the present exemplary embodiment. FIG. 4 is a plan view showing a circular trajectory of a laser beam in the present exemplary embodiment. FIG. 5 is a plan view showing a spiral-shaped trajectory of a laser beam in the present exemplary embodiment. FIG. 6 is a plan view showing a linear trajectory of a laser beam in the present exemplary embodiment. FIG. 7 is a diagram showing laser processing head 50 of the present exemplary embodiment, and portion (a) of FIG. 7 is a perspective view of a state in which shield holder 8 is taken out from laser processing head 50, portion (b) of FIG. 7 is an enlarged view of the state in which shield holder 8 is taken out from laser processing head 50, portion (c) of FIG. 7 is a perspective view of a state in which shield holder 8 is housed in laser processing head 50, and portion (d) of FIG. 7 is an enlarged view of the state in which shield holder 8 is housed in laser processing head 50. FIG. 8 is an exploded view showing shield holder 8 of the present exemplary embodiment. FIG. 9 is an external view of laser processing head 50 in the present exemplary embodiment.

First, with reference to FIG. 1, a description of laser processing system 100 will be given. Laser processing system 100 includes laser processing head 50, manipulator 60, robot controller 70, laser oscillator 80, and optical fiber 90. Laser processing head 50 irradiates workpiece W with a laser beam from optical fiber 90. Manipulator 60 whose tip is mounted with laser processing head 50, and moves laser processing head 50. Robot controller 70 controls an operation of laser processing head 50, an operation of manipulator 60, and a laser oscillation of laser oscillator 80. Laser oscillator 80 oscillates a laser beam and outputs the beam to optical fiber 90. Optical fiber 90 transmits the laser beam output from laser oscillator 80 to laser processing head 50. With this configuration, laser processing system 100 irradiates workpiece W with a laser beam output from laser oscillator 80 in a desired trajectory by operating laser processing head 50 and manipulator 60.

Next, with reference to FIG. 2, laser processing head 50 will be specifically described. Laser processing head 50 includes connector 12, lens body 1, body case 6 (the first case), shield holder 8, nozzle unit 43 (the second case), and servomotors 14, 21. Incidentally, although shield holder 8 is detachably attached to nozzle unit 43, a plurality of components may be integrated in other configurations.

(Regarding Connector 12)

Laser processing head 50 has connector 12 and is connected to optical fiber 90 through connector 12. Laser beam LB is emitted from an end of optical fiber 90 into laser processing head 50 while spreading at an angle.

(Regarding Lens Body 1)

Lens body 1 holds a lens holder to which collimation lens 4 and focus lens 5 are fixed. Collimation lens 4 collimates laser beam LB emitted from the emission end face of optical fiber 90. Then, the laser beam collimated by collimation lens 4 is condensed so as to focus on the processing point on workpiece W by focus lens 5. In this exemplary embodiment, collimation lens 4 has diameter φ of 30 mm, and an F value representing a brightness of the lens is 80. Focus lens 5 has diameter φ of 30 mm, and the F value is 500. Further, collimation lens 4 and focus lens 5 are made by applying an AR (Anti-Reflection) coating process to a synthetic quartz plano-convex lens. Incidentally, each of collimation lens 4 and focus lens 5 is not limited to a plano-convex lens and may be a lens with its spherical aberration corrected as an aspheric lens.

Further, lens body 1 is provided with cooling water hose connectors 2, 13. A water flow path is provided on an outer periphery of lens holder 3, i.e. between lens holder 3 and lens body 1. Cooling water can be introduced from cooling water hose connector 2 to lens body 1 and the cooling water can be discharged from cooling water hose connector 13 via the water flow path. Thus, by circulation of cooling water in the water flow path, collimation lens 4 and focus lens 5 can be indirectly cooled through lens holder 3. Thus, the thermal lens effect of collimation lens 4 and focus lens 5 by laser beam LB can be suppressed. The thermal lens effect is a phenomenon in which the focal position of the lens is changed by thermal deformation. Lens body 1 and lens holder 3 determine an optical position relationship between the emission end face of optical fiber 90, collimation lens 4 and focus lens 5. Cooling water, further, can suppress thermal expansion of lens holder 3 and lens body 1, and also prevents a change of the focal position due to the change of the relationship of these optical positions. The cooling water is not limited to the circulation in lens body 1, may circulate throughout the entire interior of laser processing head 50 and may prevent adverse effects due to heat of other optical members.

(Regarding Body Case 6)

Body case 6 is provided with servomotor 14 (first drive unit), timing belt 15 (first transmission member), timing belt pulley 16 (first rotation member), parallel plate 17 (first parallel plate) and holder 18 (first holder), and optical unit 41 (first optical unit) is configured by these components. Parallel plate 17 is fixed in cylindrical holder 18 whose both ends are held by bearings. Timing belt pulley 16 is provided on an outer peripheral surface of holder 18, holder 18 is rotated by servomotor 14 via timing belt 15. Specifically, holder 18 is rotated around the first rotation axis, and the direction of the first rotation axis is the same as the direction of the optical axis of the laser beam output from laser processing head 50. Servomotor 14 is, for example, a 50 W brushless DC servomotor with a serial encoder, that is, a so-called AC servomotor. The servomotor employed at a joint of manipulator 60 is also a brushless DC servomotor with a serial encoder, and is of the same type as servomotor 14. However, the servomotor employed at the joint of manipulator 60, has a different output capacitance from servomotor 14, to be precise, it is larger (100 W to 1600 W) than an output of 50 W of servomotor 14. In this way, by designing servomotors 14, 21 used for laser processing head 50 and a servomotor used for the joint of manipulator 60 so that both servomotors are of the same type, the system configuration of robot controller 70 can be simplified.

In the present exemplary embodiment, the reduction ratio between the rotation of timing belt pulley 16 and the rotation of parallel plate 17 is 32:60, and a position control resolution of servomotor 14 is 2048 ppr. Accordingly, the positional resolution of first optical unit 41 is 4.2 μm, and is a sufficient resolution for accuracy of the irradiation position of the laser beam. A maximum speed of movement of the irradiation position of the laser beam is 123 m/min or more, and is a sufficient speed for practical laser processing such as laser welding. The operating condition setting of the present exemplary embodiment is a maximum output rotation speed of 14400°/sec, and a maximum acceleration of 300000°/sec².

Further, body case 6 is provided with servomotor 21 (second drive unit), timing belt 22 (second transmission member), and timing belt pulley 20 (second rotation member), parallel plate 19 (second parallel plate), and holder 7 (second holder), and optical unit 42 (second optical unit) is configured by these members. Parallel plate 19 is fixed in cylindrical holder 7 whose both ends are held by bearings. The outer peripheral surface of holder 7 is provided with timing belt pulley 20, and holder 7 is rotated by servomotor 21 through timing belt 22. Specifically, holder 7 is rotated around the second rotation axis, and the direction of the second rotation axis is the same as the direction of the optical axis of the laser beam output from laser processing head 50. Servomotor 21 is, for example, a 50 W brushless DC servomotor with a serial encoder, that is, a so-called AC servomotor.

That is, optical unit 41 and optical unit 42 have the same configuration, and all individual components are the same. In this way, the response balances of two optical units 41, 42 become identical, which brings about easy control. Then, optical unit 41 and optical unit 42, in which the direction of the first rotation axis and the direction of the second rotation axis are the same, are arranged symmetrically in body case 6. That is, they are arranged symmetrically with respect to a plane vertical to a first rotation axis (and the second rotation axis). In FIG. 2, optical unit 41 and optical unit 42 are arranged in a vertically symmetrical manner. With this arrangement, when servomotor 14 and servomotor 21 are rotated in the same direction, the rotational direction of parallel plate 17 and the rotational direction of parallel plate 19 are opposite to each other. Furthermore, by reversing the rotational direction of servomotor 14 for driving parallel plate 17, parallel plate 17 and parallel plate 19 can also be rotated in the same direction.

Note that, from a viewpoint of miniaturization of laser processing head 50 and widening the laser irradiation range of laser processing head 50, it is desirable to arrange optical unit 41 and optical unit 42 so that the first rotation axis and the second rotation axis coincide with each other. Further, the direction of the first rotation axis and the second rotation axis is preferably the same as the direction of the optical axis of laser beam LB when the beam is made incident from optical fiber 90. Further, it is more preferable that the first rotation axis and the second rotation axis coincide with the optical axis of laser beam LB when the beam is made incident from optical fiber 90.

Next, a description of the behavior of the laser beam by optical units 41, 42 will be given.

The laser beam having passed through focus lens 5 is refracted twice (when the beam is incident on parallel plate 17 and when the beam is emitted from parallel plate 17) when passing through parallel plate 17. Accordingly, the laser beam makes a parallel shift by an amount determined from a thickness of parallel plate 17, an inclination angle of parallel plate 17 as a setting angle of parallel plate 17 with respect to the first rotation axis, and a refractive index of parallel plate 17. That is, the optical axis of the laser beam incident on parallel plate 17 (first optical axis), and the optical axis of the laser beam emitted from parallel plate 17 (second optical axis) are the same in direction, but different in position. This is also applied to parallel plate 19 having the same configuration. That is, the optical axis of the laser beam incident on parallel plate 19 (second optical axis), and the optical axis of the laser beam emitted from parallel plate 19 (third optical axis) are the same in direction, and different in position. Parallel plates 17 and 19 in the present exemplary embodiment are made of synthetic quartz, having thickness t of 13 mm, an angle of inclination of 45° with respect to the first rotation axis (second rotation axis), and a refractive index of 1.44963. In this case, the laser beam (optical axis of the laser beam) passing through parallel plate 17 is shifted by 4.1 mm. Thereafter, the laser beam (optical axis of the laser beam) is shifted by 4.1 mm similarly also when passing through parallel plate 19. Therefore, the operating range of the laser beam in the present exemplary embodiment is the inside of a circle having a radius of 8.2 mm, i.e. a diameter of 16.4 mm.

Here, the irradiation position of the laser beam by the laser processing head 50 of the present exemplary embodiment will be described with reference to FIG. 3. It is assumed that the laser beam is rotated by rotation angle θ1, and shifted by distance L by parallel plate 17, and the laser beam is rotated by rotation angle θ2, and shifted by distance L by parallel plate 19. Rotation angle θ1 is equal to the rotation angle of parallel plate 17 given by holder 18, and rotation angle θ2 is equal to the rotation angle of parallel plate 19 given by holder 7. In this case, the irradiation position of the laser beam having passed through two parallel plates 17 and 19 can be represented by two vectors having a fixed length and freely changeable rotation angles θ1 and θ2 as shown in FIG. 3. Therefore, the irradiation position of the laser beam on workpiece W may be expressed by the following equations in the XY coordinate with origin O centered.

$$X = L \cos θ1 + L \cos θ2$$

$$Y = L \sin θ1 + L \sin θ2$$

L: shift amount when the beam passes through one parallel plate
θ1: rotation angle of parallel plate 17
θ2: rotation angle of parallel plate 19

Accordingly, it can be seen that the irradiation position of the laser beam is the inside of a circle having a radius of 2 L. Then, rotation angle θ1 of parallel plate 17 and rotational angle θ2 of parallel plate 19 are controlled by independent servomotors 14, 21 respectively. Therefore, any trajectory can be drawn by a laser beam, if the irradiation position of the laser beam is within the movable range (within a circle with a radius of 2 L). In particular, when a circle having a radius of L is drawn, the circle can be drawn by driving one servomotor and suspending the other servomotor. Further, by continuation of rotation of two servomotors 14 and 21 in the same direction at the same rotational speed, circles with different radii can be drawn smoothly. Incidentally, the radius of the circle is determined by the difference between rotation angle θ1 and rotation angle θ2, and the difference is kept constant.

Next, a description of welding patterns that are often used in actual remote laser welding will be given.

As shown in FIG. 4, for a case of moving the irradiation position of the laser beam in a circle is as described above. In FIG. 4, the irradiation position of the laser beam is moved from starting point s to end point e clockwise, in a circle of trajectory R.

As shown in FIG. 5, a case of moving the irradiation position of the laser beam spirally will be described. By slightly rotating parallel plate 19 while parallel plate 17 is rotated one revolution, a circle can be drawn while increasing the radius. To describe a specific example, for example, by using the difference between rotation angle θ1 and rotation angle θ2, a location at distance r from origin O is set as starting point s. Then, by changing both rotation angle θ1 and rotation angle θ2 while the difference between rotation angle θ1 and rotation angle θ2 is changed, a circle can be drawn while increasing the radius.

Next, as shown in FIG. 6, a case of moving the irradiation position of the laser beam linearly will be described. As shown in FIG. 6, to draw a straight line so as to conform to the X-axis, the Y-coordinate only has to be zero, i.e., θ1+θ2=0° is satisfied. FIG. 6 illustrates the movement of rotation angles θ1 and θ2 both from starting point s of 0° to end point e of 180° for rotation angle θ1 and to end point e of −180° for rotation angle θ2. Further, to draw a straight line so as to conform to the Y-axis, the X-coordinate only has to be zero, i.e., θ1+θ2=180° is satisfied. Then, it can be achieved by appropriate determination of the start position even without a reverse operation of the motor. Further, as shown in a broken line in FIG. 6, for a straight line having an angle of Dx with respect to the X axis, rotational speeds θ1, θ2 may be changed so as to satisfy θ1+θ2=2·Dx.

As described above, any pattern can be drawn without a reverse operation of the motor. That is, by rotating operations in the same direction around the first rotation axis and the second rotation axis, workpiece W can be irradiated with a laser beam in an arcuate, a circular, a spiral or a linear shape without reverse operations around the first rotation axis and the second rotation axis.

Incidentally, the phase difference between rotation angle θ1 around the first rotation axis and rotation angle θ2 around the second rotation axis determines a radius of a range capable of being irradiated with a laser beam.

(Regarding Nozzle Unit 43)

Next, a description of the configuration of an end of laser processing head 50 will be given.

As shown in FIG. 2, nozzle unit 43 is connected to the vicinity of an end of body case 6 and protective glass 25 (first protective member) is fixed to an upper portion of nozzle unit 43. The nozzle unit is made by providing nozzle holder 10 with inner nozzle 11 and outer nozzle 27. The end of body case 6 is an end portion on the side where a laser beam is emitted. Further, on the end side of protective glass 25 in nozzle unit 43, a configuration is provided so as to house shield holder 8 having protective glass 26 (second protective member). To be specific, shield holder 8 is detachably attached to nozzle unit 43, and this means that protective glass 26 is also detachably attached to nozzle unit 43.

In the present exemplary embodiment, protective glass 25 has diameter φ of 40 mm and protective glass 26 has diameter φ of 30 mm, and each of them is subjected to AR coating on a window material made of synthetic quartz having thickness t of 2 mm. Protective glass 25 is fixed to laser processing head 50 (nozzle unit 43 specifically) with a screw ring (not shown).

Next, protective glass 26 and shield holder 8 will be described in detail with reference to FIG. 7(a)-7(d). Protective glass 26, in consideration of a maintenance property, is provided in shield holder 8 which slides in a direction perpendicular to the optical axis direction of the laser beam and is detachably attached to laser processing head 50. Protective glass 26 is taken out to the outside of laser processing head 50 by detachment of shield holder 8 from laser processing head 50, and is disposed in laser processing head 50 by attachment of shield holder 8 to laser processing head 50. Portion (a) and portion (b) of FIG. 7 are diagrams showing a state after removing shield holder 8 from laser processing head 50. Portion (c) and portion (d) of FIG. 7 are diagrams showing a state in which shield holder 8 is attached to laser processing head 50.

Furthermore, shield holder 8 will be described with reference to FIG. 8. FIG. 8 is an exploded view of shield holder 8 provided with protective glass 26. Shield holder 8 is configured by first member 23 and second member 24 which are separated into two so as to sandwich protective glass 26 between the members, and first member 23 and second member 24 are easily coupled and separated by an operation of lever 9 for fixing. Protective glass 26 is held in shield holder 8 circumferentially by the elastic deformation force of an O-ring, and held axially by being sandwiched between first member 23 and second member 24. First member 23 and second member 24 can be easily separated by an operation of lever 9, and replacement of protective glass 26 can be easily performed without using a tool.

It should be noted that, only protective glass 26 detachably attached to laser processing head 50 may be provided without providing protective glass 25. However, in this case, when protective glass 26 is replaced in the normal use environment of laser processing head 50, there is a possibility that a foreign material enters laser processing head 50 and adheres to parallel plate 19 or the like at the time of removal of protective glass 26. Therefore, as in the present exemplary embodiment, because of two protective glasses 25, 26 provided, no problems occur when protective glass 26 is replaced in normal use environment of laser processing head 50, and further, it is preferably possible to improve convenience.

Next, a description of prevention of the spatter or fume adhesion to protective glass 26 during laser processing will be given.

Laser processing head 50 shown in FIG. 2 is provided with a hollow truncated cone-shaped nozzle which is configured by inner nozzle 11 and outer nozzle 27, on the laser beam output end side relative to protective glass 26. Inner nozzle 11 and outer nozzle 27 are in contact with each other near a tip of the nozzle. At the tip of inner nozzle 11, openings are formed of the grooves provided radially. Compressed air taken in from the outside of laser processing head 50 through an air intake unit (not shown) can be supplied to a space surrounded by inner nozzle 11 and outer nozzle 27. Thus, high-speed air jet is ejected from openings of inner nozzle 11 to prevent the adhesion of spatters or fumes to protective glass 26. Further, since the air jet is blown against workpiece W, fumes can be prevented from being stagnant in the vicinity of the processing point of workpiece W. The fumes causes reflection, refraction or absorption of the laser beam, thereby reducing the laser output at the processing point. Incidentally, inner nozzle 11 and outer nozzle 27 are held by nozzle holder 10 of body case 6.

The tip of outer nozzle 27 is detachably attached, and when the tip is depleted or damaged, only the tip can be replaced. This configuration reduces the maintenance costs of the nozzle.

Incidentally, the minimum diameter of inner nozzle 11 which is provided with grooves on the tip is greater than the minimum diameter of replaceable outer nozzle 27, and outer nozzle 27 is configured to cover inner nozzle 11. This configuration can prevent damage of the grooves and clogging of spatters at the tip of inner nozzle 11.

Next, a description of the communication function of laser processing head 50 will be given with reference to FIG. 9.

As shown in FIG. 9, laser processing head 50 includes communication box 28 to have a communication function. Communication box 28 includes a built-in board or the like for communication. Therefore, laser processing head 50 can communicate with a personal computer or the like, which is an external device (not shown). The communication is also available in both a wired and a wireless system.

With reference to FIG. 9, a description of the communication of the laser processing head 50 will be given. Fitting 30 for mounting a device or the like is provided on a front surface of body case 6 of laser processing head 50. Illuminator 31 and camera 29 may be attached to fitting 30. For the connection between camera 29 and robot controller 70, for example, a control cable for options to be drawn from robot controller 70 to manipulator 60 is used. Therefore, the camera can be easily mounted without need to equip the cable for camera 29 separately. Then, illuminator 31 and camera 29 can be controlled from an external device such as a personal computer via communication box 28, and further images of camera 29 can be sent to an external device such as a personal computer.

As described above, laser processing head 50 of the present exemplary embodiment uses a characteristic that the laser beam is shifted when passing through parallel plates 17, 19 made of glass and is provided with parallel plates 17, 19 arranged doubly in the optical axis direction of the laser beam inside laser processing head 50. The rotations of two parallel plates 17, 19 are independently controlled by separate servomotors 14, 21 respectively, which can control the shift direction and shift amount of the laser beam. Thus, laser processing head 50 of the present exemplary embodiment can make a laser beam eccentric arbitrarily.

Further, according to laser processing head 50 of the present exemplary embodiment, compactness and light weight can be achieved as compared with the conventional galvano head, and laser processing such as spot welding or seam welding can be performed while the irradiation position of the laser beam is controlled with respect to workpiece W by shifting the laser beam.

Therefore, without using a conventional galvano head, remote laser processing with high accuracy and a high degree of freedom can be performed.

INDUSTRIAL APPLICABILITY

According to the present disclosure, a small-sized and light-weight laser processing head and a laser processing system using the laser processing head can be achieved so as to be industrially useful as a laser processing head and laser processing system to be used for the remote laser processing, for example.

The invention claimed is:

1. A laser processing system comprising:
a manipulator whose tip is mounted with a laser processing head;
a robot controller for controlling an operation of the laser processing head and an operation of the manipulator; and
a laser oscillator for outputting a laser beam,
the laser processing head including:
a collimation lens for collimating the laser beam having a first optical axis;
a focus lens for condensing the collimated laser beam;
a first parallel plate for shifting an optical axis of the condensed laser beam to a second optical axis;
a first drive unit for rotating the first parallel plate around a first rotation axis;
a second parallel plate for shifting the optical axis of the laser beam shifted to the second optical axis, to a third optical axis; and
a second drive unit for rotating the second parallel plate around a second rotation axis,
wherein a direction of the first rotation axis and a direction of the second rotation axis are identical, and
the first drive unit and the second drive unit are of a same type as a servomotor provided at a joint of the manipulator and have a different output capacitance from the servomotor.

2. The laser processing system according to claim 1, wherein the laser processing head further includes:
a first holder for holding the first parallel plate;
a first rotation member which is provided on an outer peripheral surface of the first holder and which rotates the first holder;
a first transmission member for transmitting driving force of the first drive unit to the first rotation member;
a second holder for holding the second parallel plate;
a second rotation member which is provided on an outer peripheral surface of the second holder and which rotates the second holder; and
a second transmission member for transmitting driving force of the second drive unit to the second rotation member,
wherein a first optical unit is configured by the first drive unit, the first parallel plate, the first holder, the first rotation member, and the first transmission member,
wherein a second optical unit is configured by the second drive unit, the second parallel plate, the second holder, the second rotation member, and the second transmission member, and
wherein a shape of the first optical unit and a shape of the second optical unit are identical.

3. The laser processing system according to claim 1, wherein the laser processing head further includes:
a first case for housing the first parallel plate, the first holder, the second parallel plate and the second holder;
a first protective member which transmits the laser beam shifted to the third optical axis; and
a second protective member which transmits the laser beam transmitted through the first protective member.

4. The laser processing system according to claim 3, wherein the laser processing head further includes a second case provided at an end of the first case,
wherein the first protective member is fixed to the second case, and
wherein the second protective member is detachably attached to the second case.

5. The laser processing system according to claim 4, wherein
a gas ejecting opening is provided on a side surface of the second case in the laser processing head.

6. The laser processing system according claim 1,
wherein the laser processing head further includes a communication unit for communicating with an external device.

7. The laser processing system according to claim 2, wherein the laser processing head further includes:
a first case for housing the first parallel plate, the first holder, the second parallel plate and the second holder;
a first protective member which transmits the laser beam shifted to the third optical axis; and
a second protective member which transmits the laser beam transmitted through the first protective member.

8. The laser processing system according to claim 7, wherein the laser processing head further includes a second case provided at an end of the first case,
 wherein the first protective member is fixed to the second case, and
 wherein the second protective member is detachably attached to the second case.

9. The laser processing system according to claim 8, wherein a gas ejecting opening is provided on a side surface of the second case in the laser processing head.

10. The laser processing system according to claim 2, wherein the laser processing head further includes a communication unit for communicating with an external device.

11. The laser processing system according to claim 3, wherein the laser processing head further includes a communication unit for communicating with an external device.

12. The laser processing system according to claim 4, wherein the laser processing head further includes a communication unit for communicating with an external device.

13. The laser processing system according to claim 5, wherein the laser processing head further includes a communication unit for communicating with an external device.

14. The laser processing system according to claim 7, wherein the laser processing head further includes a communication unit for communicating with an external device.

15. The laser processing system according to claim 8, wherein the laser processing head further includes a communication unit for communicating with an external device.

16. The laser processing system according to claim 9, wherein the laser processing head further includes a communication unit for communicating with an external device.

\* \* \* \* \*